US012681643B2

(12) United States Patent
Sisodia et al.

(10) Patent No.: US 12,681,643 B2
(45) Date of Patent: Jul. 14, 2026

(54) ACCESS TIME IN A MEMORY ARRAY

(71) Applicant: Arm Limited, Cambridge (GB)

(72) Inventors: Rajiv Kumar Sisodia, Bangalore (IN);
Andy Wangkun Chen, Austin, TX
(US); Yew Keong Chong, Austin, TX
(US); **Prashantkumar Jayantilal
Vaghasia, Austin, TX (US); Vishal
Thakre, Austin, TX (US); Jaspreet
Singh, Bangalore (IN); Sreelekha
Nallagatla**, Bangalore (IN)

(73) Assignee: Arm Limited, Cambridge (GB)

( * ) Notice: Subject to any disclaimer, the term of this
patent is extended or adjusted under 35
U.S.C. 154(b) by 94 days.

(21) Appl. No.: 18/651,526

(22) Filed: Apr. 30, 2024

(65) Prior Publication Data

US 2025/0335098 A1     Oct. 30, 2025

(51) Int. Cl.
*G06F 3/06* (2006.01)
(52) U.S. Cl.
CPC .......... *G06F 3/0613* (2013.01); *G06F 3/0659*
(2013.01); *G06F 3/0673* (2013.01)
(58) Field of Classification Search
CPC ............ G11C 11/4097; G11C 16/0458; G11C
16/0491; G11C 7/1096; G11C 11/1675;
G11C 11/4085; G11C 11/4096; G11C
11/413; G11C 2211/5647; G11C 5/02;
G11C 5/06; G11C 7/06; G11C 7/10;
G11C 7/1006; G11C 7/1009; G11C
7/1045; G11C 7/12; G11C 7/22; G11C
8/08; G11C 8/10; G11C 8/12; G11C 8/14;
G11C 11/401; G11C 11/404; G11C
11/407; G11C 11/4076; G11C 11/408;

G11C 11/4087; G11C 11/4091; G11C
11/412; G11C 11/4125; G11C 11/417;
G11C 11/418; G11C 11/419; G11C
16/0466; G11C 16/10; G11C 16/14;
G11C 16/26; G11C 16/3427; G11C
2211/5612; G11C 5/025; G11C 5/063;
G11C 7/1069; G11C 7/18; H10B 41/30;
H10B 41/40; H10B 43/30; H10B 69/00;
H10B 41/49; H10B 10/12; H10B 20/00;
H10B 20/60; H10B 41/20; H10B 41/27;
H10B 41/60; H10B 43/10;
(Continued)

(56) References Cited

U.S. PATENT DOCUMENTS

2023/0402069 A1* 12/2023 Kolar ................... G11C 7/1012

* cited by examiner

*Primary Examiner* — Amir Zarabian
(74) *Attorney, Agent, or Firm* — Berkeley Law &
Technology Group, LLP

(57) ABSTRACT

A memory device includes a bitcell array having at least a
first plurality of first adjacent bitcell banks and a second
plurality of second adjacent bitcell banks. One or more
bitcell array input lines are coupled to the bitcell array at a
first physical location between the first adjacent bitcell
banks. One or more bitcell array output lines are coupled to
the bitcell array at a second physical location between the
second adjacent bitcell banks. The one or more bitcell array
input lines are further coupled from the first plurality of
adjacent bitcell banks to the second plurality of bitcell banks
at a physical location between the second plurality of
adjacent bitcell banks. The one or more bitcell array output
lines are further coupled from the second plurality of bitcell
banks to the first plurality of bitcell banks at a physical
location between the first plurality of bitcell banks.

20 Claims, 6 Drawing Sheets

(58) Field of Classification Search
CPC ........ H10B 43/20; H10B 43/23; H10B 43/27;
H10B 43/40
See application file for complete search history.

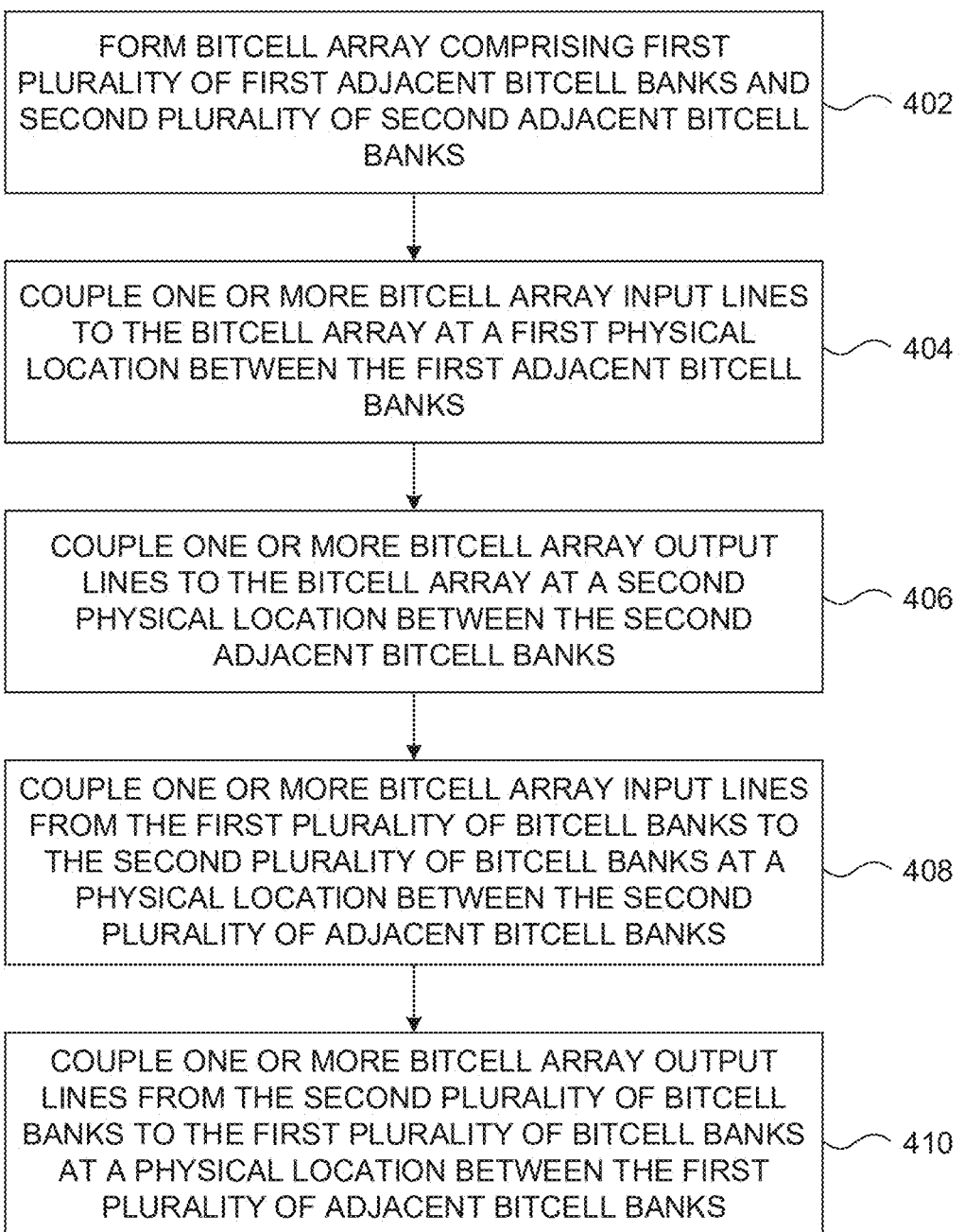

FORM BITCELL ARRAY COMPRISING FIRST PLURALITY OF FIRST ADJACENT BITCELL BANKS AND SECOND PLURALITY OF SECOND ADJACENT BITCELL BANKS ～ 402

COUPLE ONE OR MORE BITCELL ARRAY INPUT LINES TO THE BITCELL ARRAY AT A FIRST PHYSICAL LOCATION BETWEEN THE FIRST ADJACENT BITCELL BANKS ～ 404

COUPLE ONE OR MORE BITCELL ARRAY OUTPUT LINES TO THE BITCELL ARRAY AT A SECOND PHYSICAL LOCATION BETWEEN THE SECOND ADJACENT BITCELL BANKS ～ 406

COUPLE ONE OR MORE BITCELL ARRAY INPUT LINES FROM THE FIRST PLURALITY OF BITCELL BANKS TO THE SECOND PLURALITY OF BITCELL BANKS AT A PHYSICAL LOCATION BETWEEN THE SECOND PLURALITY OF ADJACENT BITCELL BANKS ～ 408

COUPLE ONE OR MORE BITCELL ARRAY OUTPUT LINES FROM THE SECOND PLURALITY OF BITCELL BANKS TO THE FIRST PLURALITY OF BITCELL BANKS AT A PHYSICAL LOCATION BETWEEN THE FIRST PLURALITY OF ADJACENT BITCELL BANKS ～ 410

FIG. 4

ACCESS TIME IN A MEMORY ARRAY

FIELD

The field relates generally to accessing a memory, and more specifically to improved access time in a memory array.

BACKGROUND

Computers store information in a variety of ways, including magnetic disk storage that has high capacity and retains its data after power is no longer supplied, nonvolatile semiconductor memory such as flash memory that similarly retains its state when power is disconnected, and volatile memory such as Static Random Access Memory (SRAM) and Dynamic Random Access Memory (DRAM) that operate more quickly but that do not retain their data states when power is removed. SRAM uses semiconductor devices such as transistors to store data, while DRAM typically uses a small capacitor to store data state and must be "refreshed" or rewritten every few seconds or it may lose its data state. Although SRAM bitcell structures are typically larger than DRAM bitcell structures, they operate faster and are therefore preferred for applications such as cache and for internal registers of a CPU. Slower but cheaper DRAM is commonly used for a computer's main memory, where capacity is the primary concern.

SRAM typically comprises a bitcell array of memory cell or bitcell structures that are each operable to store a bit (e.g., a one or zero value) of information, along with peripheral circuitry such as address decoders and circuitry operable to write or erase the contents of bitcells in the bitcell array. In some examples, the bitcell memory cell structures may be addressable via peripheral circuitry as words, where each word comprises a number of bits such as eight bits, 16 bits, 32, bits, or 64 bits that represent a single unit of data that is handled by the processor. A typical modern processor may have a number of registers used during execution of program instructions to store instruction operands and results, each of which may be formed using SRAM or a similar memory structure.

Similarly, frequently-used data may be stored in a cache local to the processor, which may typically contain tens of thousands or hundreds of thousands (or more) of words of data per core in the processor. Local cache made of SRAM bitcell arrays makes retrieval of this often-used data faster than if the same data was retrieved from main memory (or DRAM), which is typically slower and not stored local to the processor. Because SRAM registers, cache, and the like may often be integrated onto the processor die along with processor cores, graphics processors, and the like, they may take up a significant percentage of the processor die area, transistor count, and power consumed by the integrated device. When a processor accesses data stored in memory, it may send a memory request on control pins to the memory bank's internal control circuitry, causing the memory to activate the desired wordlines and read the bitlines associated with the desired bitcells to retrieve the desired data, which may then be then latched and provided as output from the memory bank. The speed of this process may depend on factors such as the input signal circuitry, the output signal circuitry, and the time taken to access the individual bitcells by activating the wordlines and reading the bitlines associated with the desired bitcells. It may therefore be desirable to manage factors such as these to improve the speed of a memory array.

BRIEF DESCRIPTION OF THE DRAWINGS

The claims provided in this application are not limited by the examples provided in the specification or drawings, but their organization and/or method of operation, together with features, and/or advantages may be best understood by reference to the examples provided in the following detailed description and in the drawings, in which:

FIG. 4 is a flow diagram of a method of forming a memory array, consistent with an example embodiment.

Figure 1:
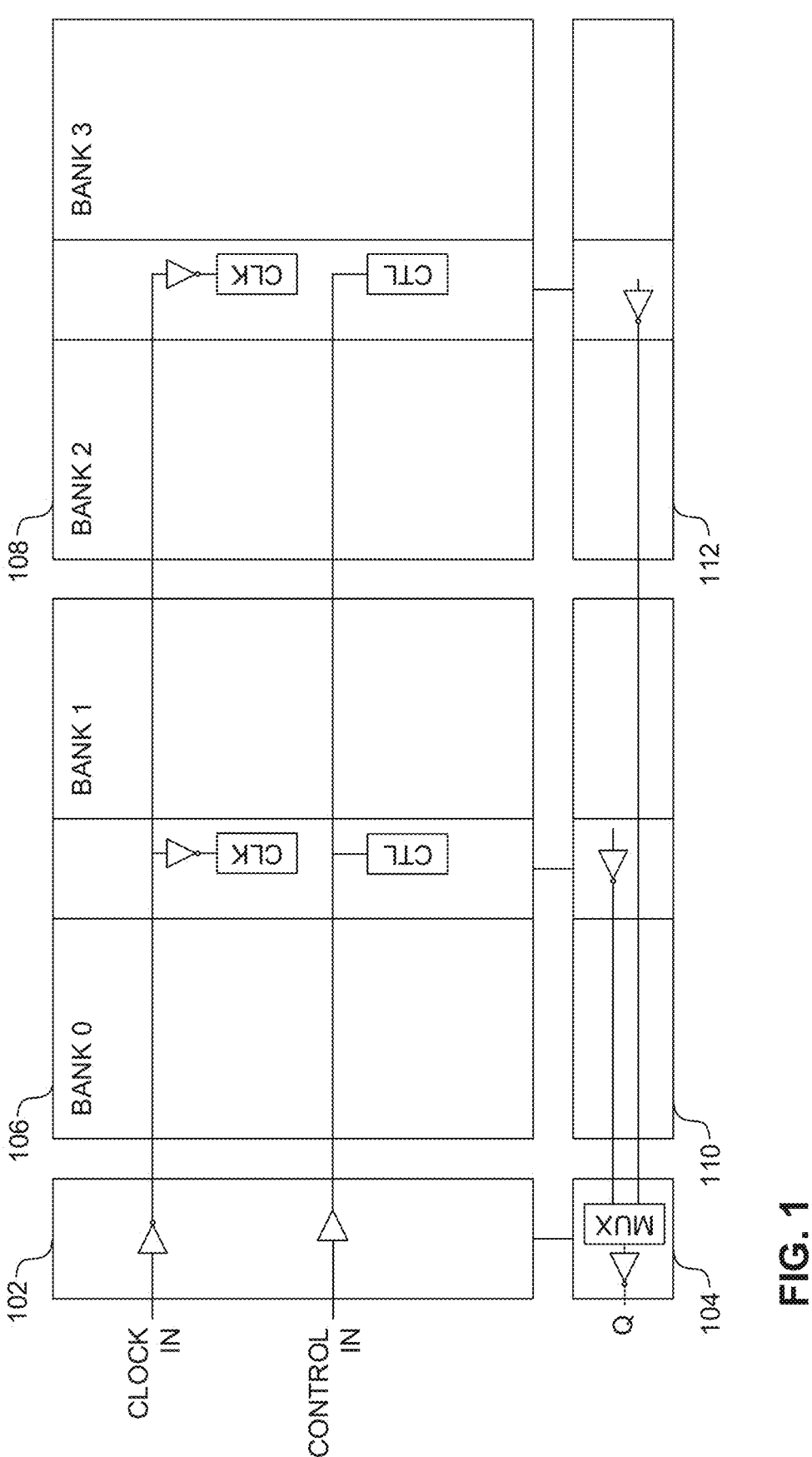
FIG. 1 is a block diagram of a memory array comprising memory banks having asymmetric access timing, as may benefit from employing some example embodiments.

Reference is made in the following detailed description to accompanying drawings, which form a part hereof, wherein like numerals may designate like parts throughout that are corresponding and/or analogous. The figures have not necessarily been drawn to scale, such as for simplicity and/or clarity of illustration. For example, dimensions of some aspects may be exaggerated relative to others. Other embodiments may be utilized, and structural and/or other changes may be made without departing from what is claimed. Directions and/or references, for example, such as up, down, top, bottom, and so on, may be used to facilitate discussion of drawings and are not intended to restrict application of claimed subject matter. The following detailed description therefore does not limit the claimed subject matter and/or equivalents.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

Data storage in computerized systems typically includes nonvolatile storage such as magnetic disk storage or flash memory that retains data such as an operating system, installed programs, saved files, and the like when a computer is powered off as well as volatile memory that loses its contents when power is removed. Volatile memory is typically much faster at reading and writing data, and so is used to hold certain operating system components, executing programs, and other data being actively used while a computer is powered on.

Common types of memory employed in computer systems include main memory that is often comprised of Dynamic Random Access Memory (DRAM), and cache memory and registers that are often comprised of Static Random Access Memory (SRAM). DRAM is generally imparts an access latency higher than that of SRAM, but takes fewer components to build per memory cell. DRAM may store a memory state in a capacitive structure to be refreshed on the order of every few seconds to maintain its contents. SRAM may use a larger structure comprising several transistors such as Metal Oxide Semiconductor Field Effect Transistors (MOSFETs) to store data, but may operate with a lower access latency than that of DRAM and so may be preferred for applications where execution speed is more important than capacity such as in cache memory or processor registers.

Memory such as SRAM or DRAM may be built from semiconductors such as on an integrated circuit substrate as an array of bitcells that can each store a single bit of information (typically represented by a one or a zero state). Bitcells may be addressable for reading or writing via peripheral circuitry that accesses the desired bitcells using a combination of bitlines and wordlines, and includes the ability to read from and/or write to addressed bitcells. Bitcells are often addressed by words rather than by individual bitcell addresses, where each word comprises a number of bits (typically a power of two ranging from eight to 64) that make up a base unit of data handled by the processor. A modern 64-bit processor may therefore primarily work with 64-bit words (or may address bitcells 64 bits at a time), but in various examples may also perform single-bit operations or work with other word sizes as well for certain operations. A processor may also have multiple registers for use during execution of software instructions to hold data such as the operands and results being used for each instruction, typically on the order of tens of registers per processor core.

While a relatively slower DRAM may be desirable for main memory of a computer where capacity may be a greater concern than access latency, SRAM may be more applicable for use in processor registers and for cache memory located near the processor core (and often on the same die or substrate as the processor cores) where access latency is of greater concern. Cache memory may store data that is also stored in main memory, but because cache may comprise lower latency SRAM bitcells and may be small in size relative to main memory, cache may provide for faster processor access to data the processor is likely to use soon. A computing device may have multiple levels of cache (e.g., L1, L2, L3, etc.), because smaller caches have lower latency or higher speed but are less likely to contain the desired data than a larger cache. While SRAM may be used for cache memory, some processors, Multi-Chip Modules (MCMs), or Application-Specific Integrated Circuits (ASICs) may also use eDRAM, which is DRAM integrated on the same die or MCM as the processor or ASIC.

Access speed for SRAM such as cache memory may also depend on factors such as the RC delay of memory access lines, the control signal input circuitry, and output circuitry such as the bitlines, multiplexers, and other components driving the output data signal from a memory array. When a memory array comprises multiple banks, it may take significantly more time to retrieve data from memory banks that are remote from the memory array's peripheral or control circuitry than from memory banks near the peripheral or control circuitry, leading to unpredictable memory delay and potentially unacceptably long memory delay for some arrays having large numbers of memory banks such as four to six or more memory banks in a cache array. In one such example, accessing the most physically remote bank from the control circuitry in a six bank memory array may take 10% or more longer than accessing the most physically near bank, resulting in a significant performance disparity between memory banks. If the memory array is configured to allow for worst-case memory access timing, the additional delay in accessing the most remote memory banks may result in reduced memory speed for every memory transaction in the memory array.

Some examples presented herein therefore provide for improved memory access speed in memory arrays having multiple memory banks. In one such example, a first group of one or more memory banks may be coupled to receive input signals and be further coupled to provide the received input signals to a second group of one or more memory banks, while the second group of memory banks may be coupled to provide output signals and be further coupled to receive output signals from the first group of memory banks. Each memory transaction, whether accessing a memory bank in the first group or second group, may therefore travel between the first group and the second group of memory banks, either in receiving the input signal in the desired memory bank or in providing the output signal from the desired memory bank. Because accessing the memory banks is more symmetric in delay experienced between different groups of memory banks, extreme slow cases may be avoided and the memory array may operate at an overall faster speed.

In a more detailed example, a memory device may include a bitcell array having at least a first plurality of first adjacent bitcell banks and a second plurality of second adjacent bitcell banks. One or more bitcell array input lines may be coupled to the bitcell array at a first physical location between the first adjacent bitcell banks, and one or more bitcell array output lines may be coupled to the bitcell array at a second physical location between the second adjacent bitcell banks. The one or more bitcell array input lines may further be coupled from the first plurality of adjacent bitcell banks to the second plurality of bitcell banks at a physical location between the second plurality of adjacent bitcell banks, and the one or more bitcell array output lines may further be coupled from the second plurality of bitcell banks to the first plurality of bitcell banks at a physical location between the first plurality of bitcell banks.

In another example, an input signa is received in a first group of one or more first adjacent bitcell banks comprising a part of the memory array, the input signal received via one or more bitcell array input electrical connections coupled to the bitcell array at a first physical location more proximate to the first group of one or more first adjacent bitcell banks than to the second group of one or more second adjacent bitcell banks. An output signal is provided from a second group of one or more second adjacent bitcell banks comprising part of the memory array, the output signal provided via one or more bitcell array output electrical connections coupled to the bitcell array at a second physical location more proximate to the second group of one or more second adjacent bitcell banks than to the first group of one or more first adjacent bitcell banks. One or more of the bitcell array input electrical connections are further coupled from the first group of one or more first adjacent bitcell banks to the second group of one or more second adjacent bitcell banks at a physical location more proximate to the second group of one or more second adjacent bitcell banks than to the first group of one or more first adjacent bitcell banks, and one or more of the bitcell array output electrical connections are further coupled from the second group of one or more second adjacent bitcell banks to the first group of one or more first adjacent bitcell banks at a physical location more proximate to the first group of one or more first adjacent bitcell banks than to the second group of one or more second adjacent bitcell banks.

In further examples, additional bitcell array banks may be physically located between the first group of bitcell banks and the second group of bitcell banks, and the bitcell array input lines and bitcell array output lines coupling the first and second groups of bitcell banks couple the first and second groups of bitcell banks via the additional bitcell array banks. Such a configuration may operate more slowly than arrays having fewer groups of bitcell banks, but may retain an improved degree of uniformity or symmetry in access time across the bitcell banks in the array, thereby improving overall access speed of the bitcell array. Various examples presented herein may further be implemented as methods, as apparatus such as memory devices, or as machine-readable media storing instructions for fabrication of the devices or implementation of the methods described, such as via a hardware description language or register-transfer level code.

FIG. 1 is a block diagram of a memory array comprising memory banks having asymmetric access timing, as may benefit from employing some example embodiments. The memory array in this example comprises peripheral or control input circuit 102 and output circuit 124, as well as a first group of memory banks 106 and a second group of memory banks 108. Although two memory banks per group are shown in this example, other examples may have more or fewer memory banks per group, such as one memory bank per group, four memory banks per group, or the like.

Each group of memory banks in this example comprises a local clock (CLK) derived from a clock input signal received via control input circuit 102, as well as control circuitry (CTL) that receives control inputs such as memory address locations, read or write instructions, and the like from the control in signal received in control input circuit 102. The groups of memory banks in the memory array example of FIG. 1 are further coupled to memory group output circuitry 110 and 112, such as comparators, latches, inverters, and other circuitry as may be employed in various examples to handle data that is being read from or written to the respective groups of memory banks to which they are coupled.

In operation, a memory operation such as a memory read request is received in control input circuit 102, and the request is sent via a circuit connection such as a metal wire, polysilicon, or the like to control circuitry in the group of memory banks having the memory bank that is storing the requested data. When the correct memory bank is accessed and the data is retrieved, the data is provided as an output via memory group output circuitry 110 or 112 to control output circuit 104 which outputs the requested data (shown as Q). If the memory location storing the requested data is in bank 0 or bank 1 of the first group of memory banks 106, the operation may be completed somewhat faster than if the requested data is stored in bank 2 or bank 3 of the second group of memory banks 108 due to the longer path that the control input signal must travel and the longer path that the output signal must travel to reach control circuits 102 and 104.

Memory access to a cache memory configured as shown in the example of FIG. 1 may therefore have asymmetric access speed, in one more detailed example taking 5-10% longer to access data stored in banks 2 or 3 than accessing data stored in banks 0 or 1. If additional groups of memory banks are coupled to the example of FIG. 1, such as daisy-chaining one or more additional groups of memory banks to the right of the second group of memory banks 108, the worst-case access time for the farthest such banks from the control circuits 102 and 104 may be significantly longer. Implementing a memory design such as the examples described in conjunction with FIG. 1 may result in significant variation in the time that a processor or other device must wait for a memory operation to complete, or may employ a uniform memory timing based on the worst-case time needed to access the group of memory banks farthest from the control circuitry.

Figure 2:
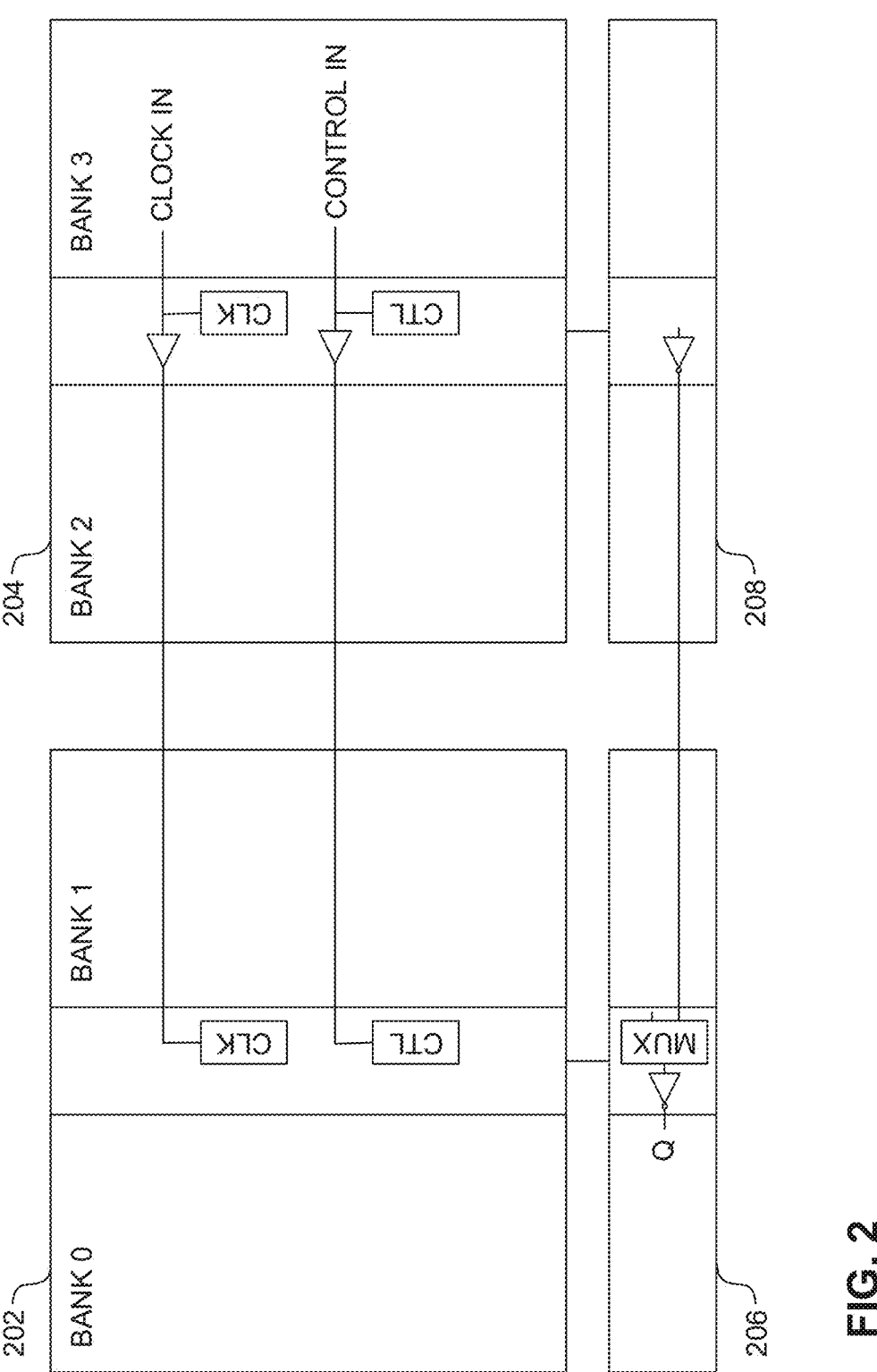
FIG. 2 is a block diagram of a memory array comprising groups of memory banks having symmetric access timing, consistent with an example embodiment.

FIG. 2 is a block diagram of a memory array comprising groups of memory banks having symmetric access timing, consistent with an example embodiment. Here, a first group of memory banks shown at 202 includes memory bank 0 and memory bank 1, and a second group of memory banks shown at 204 includes memory bank 2 and memory bank 3. Each of the memory banks comprises an array of bitcells such as SRAM, operable to store data. Control and clock input signals are received in the control or peripheral circuitry of the second group of memory banks 204, and are distributed via electrical connections to the control circuitry of the first group of memory banks 202. Output data signals (represented by Q in FIG. 2) are provided via the output control circuitry 206 associated with the first group of memory banks 202, and the output control circuitry shown at 206 is further coupled to output control circuitry at 208 to receive and output data from the second group of memory banks shown at 204.

In operation, reading a memory location in the first group of memory banks 202 may comprise receiving clock and control signals in the second group of memory banks 204 to perform the read operation, and sending the clock and control signals from the second group of memory banks 204 to the first group of memory banks 202. The memory location may be read responsive to the received control signals, and the stored data may be provided from the memory banks in group 202 to the output control circuitry shown at 206 to provide the data being read from the memory array. The combination of input control signals and output signals therefore traverse between memory bank groups one time, to provide the received control and clock signals from the second group of memory banks 204 to the first group of memory banks 202.

If a read operation is received for a memory location in the second group of memory banks 204, the control and clock input signals may be received in the second memory group's control circuitry directly, and a memory operation performed without waiting for the received control signals to be sent to another group of memory banks. The contents of the memory location being read may be provided to the output control circuitry 208 associated with the second group of memory banks 204, and sent to the output control circuitry 206 associated with the first group of memory banks 202 to be selected via a multiplexer and provided as an output from the memory array. The combination of input control signals and output signals if a read operation is performed for a memory location in the second group of memory banks 204 therefore also traverses between memory banks one time, as the output of the read operation travels from the output control circuitry 208 of the second group of memory banks to the output control circuitry 206 of the first group of memory banks to be multiplexed and provided as an output from the memory array.

Because read operations from either group of memory banks result in either the input control signals or the output data signals traversing between memory banks one time, the access time for the various memory banks in the memory array shown in FIG. 2 is approximately the same for any of the memory banks shown. This configuration avoids the worst-case scenario of accessing memory banks from the second, or more remote group of memory banks 108 of FIG. 1, and results in uniform and predictable access timing for the memory array of FIG. 2. Because the memory array of FIG. 2 does not experience the worst-case scenario of accessing memory banks from the second group of memory banks of FIG. 1, memory arrays having symmetric access timing as in the example of FIG. 2 may operate significantly faster (e.g. 5% to 10%) than memory arrays having fixed timing that account for worst-case asymmetric timing as is shown and described in the example of FIG. 1.

The example of FIG. 2 further shows use of an inverter to drive output signals from output control circuitry 208 associated with the second group of memory banks 204 to the multiplexer of output control circuitry 206 associated with the first group of memory banks 202. The output signals from the first group of memory banks 202 do not need to be inverted to be driven to another output control circuit, and so are provided directly to the multiplexer of output control circuit 206. Output from the multiplexer is similarly inverted to drive output electrical connections from the memory array, resulting in data from the second group of memory banks 204 being inverted twice and therefore restored to its original state. Because data from the first group of memory banks may only be inverted once, after the multiplexer as shown at 206 of FIG. 2, the output bitlines BL and BL may be swapped before connection to a sense amplifier or comparator to invert the data as read directly from the bitcells of the memory banks in the first group.

Figure 3:
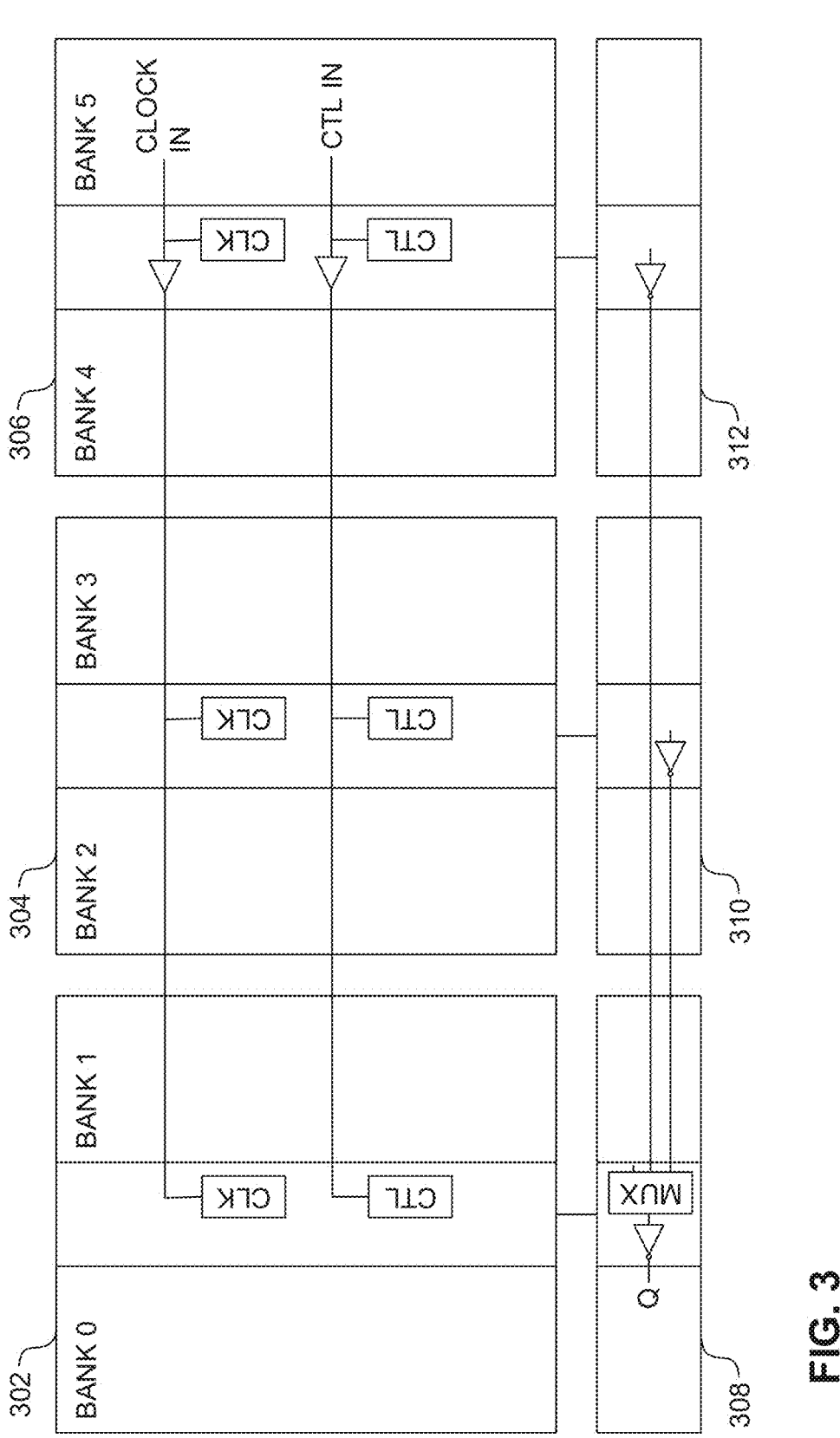
FIG. 3 is a block diagram of a memory array comprising three groups of memory banks having symmetric access timing, consistent with an example embodiment.

FIG. 3 is a block diagram of a memory array comprising three or more memory banks having symmetric access timing, consistent with an example embodiment. In the example of FIG. 3, a third group of memory banks shown at 304 is added between the first group of memory banks 302 and the second group of memory banks 306, which approximately correspond to the first group of memory banks 202 and the second group of memory banks 204 of the example of FIG. 2. The third group of memory banks 304 here is physically located between the first group of memory banks 302 and the second group of memory banks 306, and in further examples there may similarly be additional groups of memory banks located between the first and second groups of memory banks.

The third group of memory banks is coupled to the input clock and input control signals received in the second group of memory banks between the first group of memory banks and the second group of memory banks. The output control circuitry 310 associated with the third group of memory banks is similarly coupled to the output control circuitry 308 associated with the first group of memory banks and providing the output (Q) between the output control circuitry 308 associated with the first group of memory banks 302 and the output control circuitry 312 associated with the second group of memory banks 306. The output control circuitry 310 associated with the third group of memory banks is inverted to drive the electrical signal to output control circuitry 308 associated with the first group of memory banks, similar to the inverter driving the output control circuitry associated with the second group of memory control banks 312 and at 208 of the example of FIG. 2. The output bitlines BL and BL of the first group of memory banks may be swapped before connection to a sense amplifier or comparator to invert the data as read directly from the bitcells of the memory banks in the first group, similar to the example shown in FIG. 2.

The example of FIG. 3 retains approximately symmetric read times between each group of memory banks by maintaining the length of the combined input control signals and output signals that a read or write operation from each memory bank or group of memory banks travels, resulting in more uniform memory array access timing and potentially reduced memory array timing by eliminating worst-case memory access scenarios from occurring for memory banks or groups of memory banks that are most remote from input and output control circuitry.

If a memory read operation is performed in a memory location in the first group of memory banks 302, the input control signal and clock input received in the second group of memory banks 306 traverse through the third group of memory banks 304 to the first group of memory banks 302, and the output of the read operation is output from output control circuit 308 associated with the first group of memory banks. If a memory read operation is performed in a memory location in the second group of memory banks 306, the input control signal and clock input received in the second group of memory banks result in reading the desired data from within the second group of memory banks, and the output of the read operation sent from associated output circuitry 312 traverses the output circuitry 310 associated with the third group of memory banks to the output circuitry 308 associated with the first group of memory banks where it is provided as an output of the read operation from the memory array. If a memory operation is performed in a memory location in the third group of memory banks 304, the input control signal and clock input received in the second group of memory banks 306 are conveyed to the third group of memory banks 304 where the data is read and output via associated output control circuitry 310. The output of the read operation sent from associated output circuitry 310 to the output circuitry 308 associated with the first group of memory banks, where it is provided as an output of the read operation from the memory array.

Each memory operation therefore results in some combination of input or output signals traversing twice between different groups of memory banks or their associated output circuits, resulting in approximately symmetric access time across the three groups of memory banks shown in FIG. 3. In further examples, the number of groups of memory banks between the first group of memory banks 302 and the second group of memory banks 306 may be larger, but access time symmetry between groups of memory banks may be maintained using the configuration of the example of FIG. 3 as each memory operation for N groups of memory banks will traverse N−1 groups in some combination of input and/or output signal communication.

FIG. 4 is a flow diagram of a method of forming a memory array, consistent with an example embodiment. A bitcell array is formed at 402, comprising a first plurality or group of adjacent bitcell banks and a second plurality or group of adjacent bitcell banks. In various alternate examples, the groups of adjacent bitcell banks may comprise one or more bitcell banks per group. One or more bitcell array input lines are connected to the bitcell array at physical location between the first adjacent bitcell banks at 404, and one or more bitcell array output lines are connected to the bitcell array at a second physical location between the second adjacent bitcell banks at 406.

The one or more bitcell array input lines are further coupled from the first plurality fo bitcell banks to the second plurality of bitcell banks at a physical location between the second plurality of adjacent bitcell banks at 408, and the one or more bitcell array output lines are coupled from the second plurality of bitcell banks to the first plurality of bitcell banks at a physical location between the first plurality of adjacent bitcell banks at 410.

In a further example, a third plurality of adjacent bitcell banks is formed, and is coupled to the bitcell array input lines at a third physical location between the third adjacent bitcell banks and coupled to the bitcell array output lines at a third physical location between the third adjacent bitcell banks. The bitcell array input lines coupled to the third adjacent bitcell banks are coupled at a physical location between the physical location where the bitcell array input lines are coupled to the first adjacent bitcell banks and the physical location where the bitcell array input lines are coupled to the second adjacent bitcell banks. The bitcell array output lines are coupled to the third adjacent bitcell banks at a physical location between the physical location where the bitcell array output lines are coupled to the first adjacent bitcell banks and the physical location where the bitcell array output lines are coupled to the second adjacent bitcell banks.

In an alternate embodiment, a bitcell array is formed comprising at least a first group of one or more first adjacent bitcell banks and a second group of one or more second adjacent bitcell banks. One or more bitcell array input electrical connections are coupled to the bitcell array at a first physical location more proximate to the first group of one or more first adjacent bitcell banks than to the second group of one or more second adjacent bitcell banks, and one or more bitcell array output electrical connections are coupled to the bitcell array at a second physical location more proximate to the second group of one or more second adjacent bitcell banks than to the first group of one or more first adjacent bitcell banks. The one or more bitcell array input electrical connections are further coupled from the first group of one or more first adjacent bitcell banks to the second group of one or more second adjacent bitcell banks at a physical location more proximate to the second group of one or more second adjacent bitcell banks than to the first group of one or more first adjacent bitcell banks, and the one or more bitcell array output electrical connections are further coupled from the second group of one or more second adjacent bitcell banks to the first group of one or more first adjacent bitcell banks at a physical location more proximate to the first group of one or more first adjacent bitcell banks than to the second group of one or more second adjacent bitcell banks.

Figure 5:
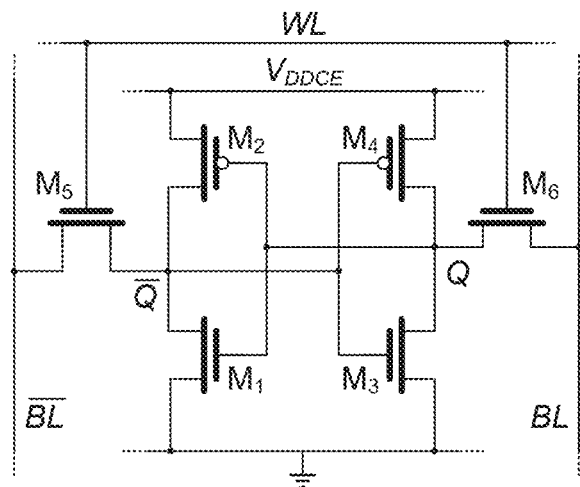
FIG. 5 is a schematic diagram of a static random access memory (SRAM) cell, consistent with an example embodiment.

FIG. 5 is a schematic diagram of a static random access memory (SRAM) cell, consistent with an example embodiment. The SRAM memory cell of FIG. 5 is often referred to as a 6T SRAM cell due to its six transistors, but other SRAM memory cell configurations exist and may also be used to form bitcell arrays such as those in the examples presented herein.

The memory cell can store a "bit" or single high or low state of information using the four transistors M1, M2, M3, and M4. These four transistors form two cross-coupled inverters, which are stable in either a high or low (i.e., a 1 or 0) state. Access transistors M5 and M6 control access to the cross-coupled inverters formed by M1, M2, M3, and M4 during read and write operations. Word lines denoted by WL and bitlines denoted by BL are used to select which memory bitcells in a bitcell array are being addressed, and use of both a bitline BL and inverse bitline BL may improve noise margins and speed of the SRAM bitcell.

In operation, the bitcell may operate in standby, reading, or writing states. In a standby state, the word line WL is not active, the access transistors M5 and M6 disconnect the cell from the bit lines, and the cross-coupled inverters formed by M1, M2, M3, and M4 reinforce each other to retain their state as long as they remain powered.

In a reading state, the word line WL is brought high, and one or both of the bitline BL and inverse bitline BL may be read to determine the state of the bitcell. Because the bitlines are often relatively long and have some parasitic capacitance, reading the state of a memory cell is often done by precharging both bitlines BL and BL with a one or high value, asserting the word line WL thereby enabling transistors M5 and M6, and observing which bitline voltage drops relative to the other bitline such as by using a comparator or sense amplifier to speed up the read operation.

To write a value to the bitcell the value to be applied is written to the bit lines, such as writing a one value as bringing bitline BL to a one or high state and BL to a zero or low state. The word line WL is then asserted, and the value to be stored is latched into the bitcell. In a more detailed example, the bit line inputs are driven with a strong enough voltage signal to overcome the relatively weak transistors in the bitcell such that they can easily override the previous state of the bitcell's cross-coupled inverters. Because the inverters are cross-coupled, a slight change in state to one of the inverters (e.g. transistor pair M1 and M2) will help overwrite the state of the other pair of inverters. Access NMOS transistors M5 and M6 may be further designed to be stronger than the transistors M1, M2, M3, and M4, contributing to the speed of the write process.

Arrays of SRAM may be formed in a two-dimensional grid, with row and column decoders in peripheral circuitry selecting wordlines and bitlines associated with bitcells based on their memory address to access the bitcells. Bitcells are often accessed one word at a time, where a word may comprise a byte (or 8 bits), or another power of two such as 16, 32, or 64 bits. In other examples, memory operations may be conducted on words, single bits, pages of words, or other units of addressable memory to write and store information in the SRAM.

The examples shown here demonstrate how inrush current in a memory such as SRAM cache may be managed by using one or more integrated delay elements such as inverters, RC delay lines, and the like to significantly slow down power down signal propagation between memory instances in a memory array. The delay in some examples may be between memory instances, while in other examples the delay is also introduced between bitcell arrays within a memory instance. Further examples may be configured to delay a power up signal, but to pass a power down signal more quickly through a series of sequentially-linked or daisy-chained memory instances. By staggering or delaying the power up times of interconnected or chained memory instances, inrush current when powering the memory instances on or resuming from an inactive state can be reduced.

Figure 6:
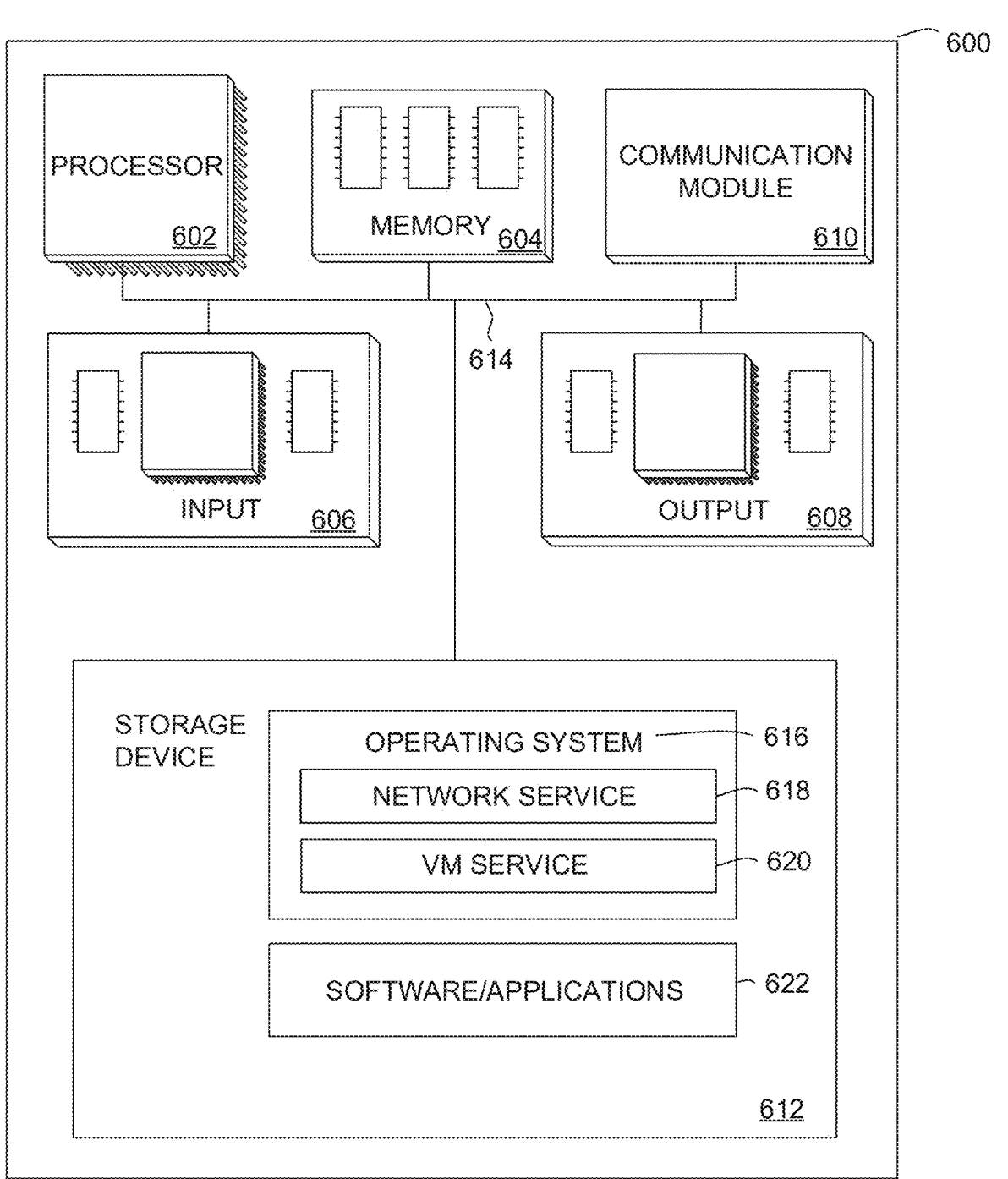
FIG. 6 shows a block diagram of a general-purpose computerized system, consistent with an example embodiment.

FIG. 6 shows a block diagram of a general-purpose computerized system, consistent with an example embodiment. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600, in one example, further includes an operating system 616 executable by computing device 600. The operating system includes in various examples services such as a network service 618 and a virtual machine service 620 such as a virtual server. One or more applications, such as application 622 are also stored on storage device 612, and are executable by computing device 600.

Each of components 602, 604, 606, 608, 610, and 612 may be interconnected (physically, communicatively, and/or operatively) for inter-component communications, such as via one or more communications channels 614. In some examples, communication channels 814 include a system bus, network connection, inter-processor communication network, or any other channel for communicating data. Applications such as software application 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 612, in some examples, is known as a computer-readable storage medium. In some examples, storage device 612 comprises temporary memory, meaning that a primary purpose of storage device 612 is not long-term storage. Storage device 612 in some examples is a volatile memory, meaning that storage device 612 does not maintain stored contents when computing device 600 is turned off. In other examples, data is loaded from storage device 612 into memory 804 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as software application 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 612 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 600 uses communication module 610 to wirelessly communicate with an external device such as via a public network.

Computing device 600 also includes in one example one or more input devices 606. Input device 606, in some examples, is configured to receive input from a user through tactile, audio, or video input. Examples of input device 606 include a touchscreen display, a mouse, a keyboard, a voice responsive system, video camera, microphone or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 808 include a speaker, a light-emitting diode (LED) display, a liquid crystal display (LCD or OLED), or any other type of device that can generate output to a user.

Computing device 600 may include operating system 616. Operating system 616, in some examples, controls the operation of components of computing device 600, and provides an interface from various applications such as software application 622 to components of computing device 600. For example, operating system 816, in one example, facilitates the communication of various applications such as software application 622 with processors 602, communication unit 610, storage device 612, input device 606, and output device 608. Applications such as application 622 may include program instructions and/or data that are executable by computing device 600. These and other program instructions or modules may include instructions that cause computing device 600 to perform one or more of the other operations and actions described in the examples presented herein.

Bitcell arrays, memory structures, memory instances, peripheral circuitry, and other circuits as described herein in particular examples may be formed in whole or in part by and/or expressed in transistors and/or lower metal interconnects (not shown) in processes (e.g., front end-of-line and/or back-end-of-line processes) such as processes to form complementary metal oxide semiconductor (CMOS) circuitry. The various blocks, neural networks, and other elements disclosed herein may be described using computer aided design tools and expressed (or represented), as data and/or instructions embodied in various computer-readable media, in terms of their behavioral, register transfer, logic component, transistor, layout geometries, and/or other characteristics.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Features of example computing devices employed in example embodiments may comprise features, for example, of a client computing device and/or a server computing device. The term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU), image signal processor (ISP) and/or neural processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112(f) so that it is specifically intended that 35 USC § 112(f) not be implicated by use of the term "computing device," "processor," "processing unit," "processing circuit" and/or similar terms; however, if it is determined, for some reason not immediately apparent, that the foregoing understanding cannot stand and that 35 USC § 112(f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 6 and in the text associated with the foregoing figure(s) of the present patent application.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A memory device, comprising:
a bitcell array comprising at least a plurality of first adjacent bitcell banks and a plurality of second adjacent bitcell banks;
one or more bitcell array input lines coupled to the bitcell array at a first physical location between the first adjacent bitcell banks; and
one or more bitcell array output lines coupled to the bitcell array at a second physical location between the plurality of second adjacent bitcell banks;
wherein the one or more bitcell array input lines are further coupled from the plurality of first adjacent bitcell banks to the plurality of second adjacent bitcell banks at a physical location between the plurality of second adjacent bitcell banks, and the one or more bitcell array output lines are further coupled from the plurality of second adjacent bitcell banks to the plurality of first adjacent bitcell banks at a physical location between the plurality of first adjacent bitcell banks.

US 12,681,643 B2

15

2. The memory device of claim 1, wherein a physical location between each respective plurality of bitcell banks comprises a physical location nearer a geometric center of each respective plurality of bitcell banks than edges of each respective plurality of bitcell banks.

3. The memory device of claim 1, wherein the one or more bitcell array input lines are configured to provide one or more of clock, address, input data, and control signals, and are configured to provide a clock input signal to a local clock circuit for each plurality of adjacent bitcell banks in the bitcell array.

4. The memory device of claim 1, wherein the one or more bitcell array output lines are configured to provide data read from bitcells as a memory read operation output.

5. The memory device of claim 4, wherein the one or more bitcell array output lines of respective pluralities of adjacent bitcell banks other than the plurality of second adjacent bitcell banks comprises an inverter, an amplifier, or a combination thereof, and are inverted with respect to the bitcell array output lines of the plurality of second adjacent bitcell banks.

6. The memory device of claim 1, wherein the bitcell array further comprises a third plurality of adjacent bitcell banks physically located between the first adjacent bitcell banks and the plurality of second adjacent bitcell banks.

7. The memory device of claim 6, the third plurality of adjacent bitcell banks further coupled to the one or more bitcell array input lines and the one or more bitcell array output lines at a third physical location between the third plurality of adjacent bitcell banks.

8. A non-transitory computer-readable medium storing computer-readable code for fabrication of the memory device of claim 7.

9. A non-transitory computer-readable medium storing computer-readable code for fabrication of the memory device of claim 1.

10. A memory device, comprising:
a bitcell array comprising at least a first group of one or more first adjacent bitcell banks and a second group of one or more second adjacent bitcell banks;
one or more bitcell array input electrical connections coupled to the bitcell array at a first physical location more proximate to the first group of one or more first adjacent bitcell banks than to the second group of one or more second adjacent bitcell banks; and
one or more bitcell array output electrical connections coupled to the bitcell array at a second physical location more proximate to the second group of one or more second adjacent bitcell banks than to the first group of one or more first adjacent bitcell banks;
wherein the one or more bitcell array input electrical connections are further coupled from the first group of one or more first adjacent bitcell banks to the second group of one or more second adjacent bitcell banks at a physical location more proximate to the second group of one or more second adjacent bitcell banks than to the first group of one or more first adjacent bitcell banks, and the one or more bitcell array output electrical connections are further coupled from the second group of one or more second adjacent bitcell banks to the first group of one or more first adjacent bitcell banks at a physical location more proximate to the first group of one or more first adjacent bitcell banks than to the second group of one or more second adjacent bitcell banks.

11. The memory device of claim 10, wherein a physical location more proximate to each respective group of bitcell banks comprises a physical location nearer a geometric center of each respective group of bitcell banks than a geometric center of one or more groups of bitcell banks other than the respective group of bitcell banks.

12. The memory device of claim 10, wherein the one or more bitcell array input electrical connections are configured to provide one or more of clock, address, input data, and control signals, and are configured to provide a clock input signal to a local clock circuit for each group of adjacent bitcell banks in the bitcell array.

13. The memory device of claim 10, wherein the one or more bitcell array output electrical connections are configured to provide data read from bitcells as a memory read operation output.

14. The memory device of claim 13, wherein the one or more bitcell array output electrical connections of respective pluralities of adjacent bitcell banks other than the one or more second adjacent bitcell banks comprises an inverter, an amplifier, or a combination thereof, and are inverted with respect to the one or more bitcell array output electrical connections of the one or more second adjacent bitcell banks.

15. The memory device of claim 10, wherein the bitcell array further comprises a third group of adjacent bitcell banks physically located in proximity to the first group of adjacent bitcell banks and to the second group of adjacent bitcell banks.

16. The memory device of claim 15, the third group of adjacent bitcell banks further coupled to the one or more bitcell array input electrical connections and the one or more bitcell array output electrical connections at a third physical location more proximate to the third group of one or more third adjacent bitcell banks than to the first group of one or more first adjacent bitcell banks or the second group of one or more second adjacent bitcell banks.

17. A method of operating a memory bitcell array, comprising:
receiving an input signal in a first group of one or more first adjacent bitcell banks comprising a part of the memory bitcell array, the input signal received via one or more bitcell array input electrical connections coupled to the memory bitcell array at a first physical location more proximate to the first group of one or more first adjacent bitcell banks than to a second group of one or more second adjacent bitcell banks;
providing an output signal from a second group of one or more second adjacent bitcell banks comprising part of the memory bitcell array, the output signal provided via one or more bitcell array output electrical connections coupled to the memory bitcell array at a second physical location more proximate to the second group of one or more second adjacent bitcell banks than to the first group of one or more first adjacent bitcell banks;
wherein the one or more bitcell array input electrical connections are further coupled from the first group of one or more first adjacent bitcell banks to the second group of one or more second adjacent bitcell banks at a physical location more proximate to the second group of one or more second adjacent bitcell banks than to the first group of one or more first adjacent bitcell banks, and the one or more bitcell array output electrical connections are further coupled from the second group of one or more second adjacent bitcell banks to the first group of one or more first adjacent bitcell banks at a physical location more proximate to the first group of one or more first adjacent bitcell banks than to the second group of one or more second adjacent bitcell banks.

18. The method of operating a memory bitcell array of claim 17, wherein the memory bitcell array further comprises one or more third adjacent bitcell banks located in proximity to the one or more first adjacent bitcell banks and the one or more second adjacent bitcell banks, the one or more third adjacent bitcell banks further coupled to the one or more bitcell array input electrical connections and the one or more bitcell array output electrical connections at a third physical location more proximate to the one or more third adjacent bitcell banks than to the first group of one or more first adjacent bitcell banks or the second group of one or more second adjacent bitcell banks.

19. The method of operating a memory bitcell array of claim 17, wherein the one or more bitcell array output electrical connections of respective pluralities of adjacent bitcell banks other than the one or more second adjacent bitcell banks comprises an inverter, an amplifier, or a combination thereof, and are inverted with respect to the one or more bitcell array output electrical connections of the one or more second adjacent bitcell banks.

20. The method of operating a memory bitcell array of claim 17, wherein the one or more bitcell array input electrical connections are configured to provide one or more of clock, address, input data, and control signals, and the one or more bitcell array output electrical connections are configured to provide data read from bitcells as a memory read operation output.

*   *   *   *   *